June 26, 1962 L. W. WATERS 3,040,868
PEAR ORIENTING AND FEEDING MACHINE
Filed Feb. 19, 1960 7 Sheets-Sheet 2

FIG-2

INVENTOR.
LAWRENCE W. WATERS
BY
Mellin and Hanscom
ATTORNEYS

June 26, 1962 — L. W. WATERS — 3,040,868
PEAR ORIENTING AND FEEDING MACHINE
Filed Feb. 19, 1960 — 7 Sheets-Sheet 3

FIG-3

INVENTOR.
LAWRENCE W. WATERS
BY
Mellin and Hanscom
ATTORNEYS

FIG-4

June 26, 1962 L. W. WATERS 3,040,868
PEAR ORIENTING AND FEEDING MACHINE
Filed Feb. 19, 1960 7 Sheets-Sheet 5

INVENTOR.
LAWRENCE W. WATERS
BY
Mellin and Hanscom
ATTORNEYS

June 26, 1962 L. W. WATERS 3,040,868
PEAR ORIENTING AND FEEDING MACHINE
Filed Feb. 19, 1960 7 Sheets-Sheet 7

INVENTOR.
LAWRENCE W. WATERS
BY
Mellin and Hanscom
ATTORNEYS

United States Patent Office 3,040,868
Patented June 26, 1962

3,040,868
PEAR ORIENTING AND FEEDING MACHINE
Lawrence W. Waters, Fullerton, Calif., assignor to Hunt Foods and Industries Inc., Fullerton, Calif., a corporation of Delaware
Filed Feb. 19, 1960, Ser. No. 9,740
20 Claims. (Cl. 198—33)

This invention relates to food handling apparatus, and more specifically to a machine for orienting and feeding pears to a pear peeling machine.

There are various pear coring and peeling machines in use at the present time which are manually fed. In general, these machines have a plurality of oscillating cups into which operators place pears in stem-down orientation. In the cycle of operation, the cups swing up from their loading positions, carrying the pears towards rotatable spindles and impale the pears thereon. The pears are then rotated against suitable knives which core and peel them. In the meantime, the empty cups swing back to their loading positions to be again manually loaded by the operators. In these machines, every pear must be manually picked up, oriented and placed into the cups by an operator.

The primary object of this invention is to provide a pear orienting and feeding machine for use with the above described type of pear peeling machine which eliminates manual handling of the pears.

A further object of the invention is to provide a pear orienting and feeding machine for use in loading the cups of a pear handling apparatus, the orienting machine having an orienting trough for each cup, into which troughs pears are dumped in random orientation, and in which the pears are removed from the troughs in oriented position and are place in the loading cups of the pear handling machine in synchronism with the operation of the pear handling machine.

A still further object of the invention is to provide a pear orienting device as set forth in the last object and in which the orienting troughs each comprise a pair of parallel rotating screw members supporting a pear thereon and which rotate with unequal rates of thread advance, causing a pear to rotate about a vertical axis so that the stem end of the pear will swing down to between the screw members as the pear is moved by both screw members to the end of the orienting trough.

Other objects and advantages will become apparent in the course of the following detailed description.

In the drawings, forming a part of this application, and in which like parts are designated by like reference numerals throughout the same.

In general terms, the pear orienting and feeding machine of the present invention is provided with a hopper into which pears are dumped in random orientation from a conveyor belt or the like. The pears are then removed from the hopper and deposited into a number of orienting troughs, there being one trough for each loading cup of the pear peeling machine.

The troughs are each formed by two parallel rotating screw members which support the pears thereon. The screw members of each pair are rotated at different speeds so that the rate of thread advance on one is greater than the other, causing the pears to rotate about a vertical axis as they are moved towards the front end of the machine. At some time during the rotation of the pears, their axes will be generally parallel to the screw members, and their stem ends will swing down between the screws into an oriented position.

After orientation, the pears will continue to be moved forwardly by the screws. As they reach the forward end of the machine they are gripped by pickup heads and moved into vertical alignment with the pear peeling machine cups. The pears are then lowered and released into the cups. Synchronism between the two machines is obtained by driving the pear orientor from the pear peeling machine.

Figure 1:
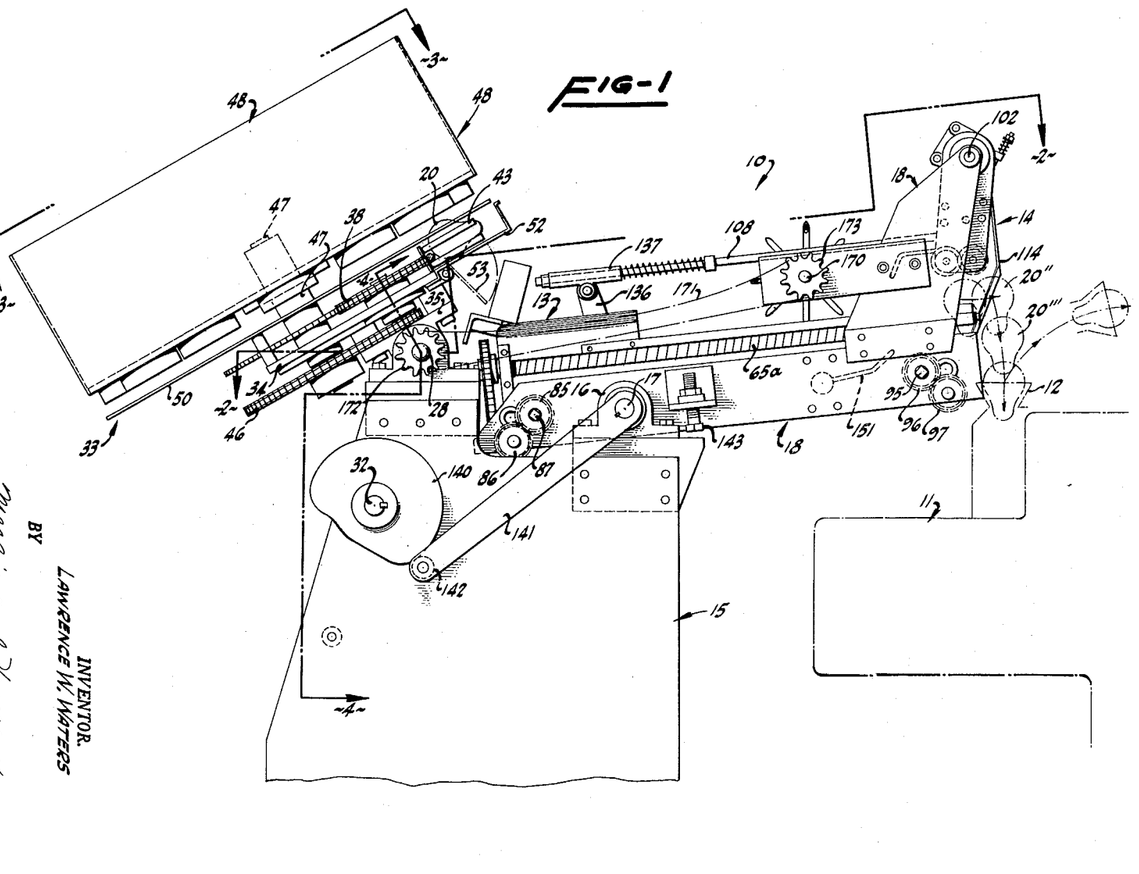
FIG. 1 is a side elevational view of a pear orienting device constructed in accordance with the invention.
Figure 2:
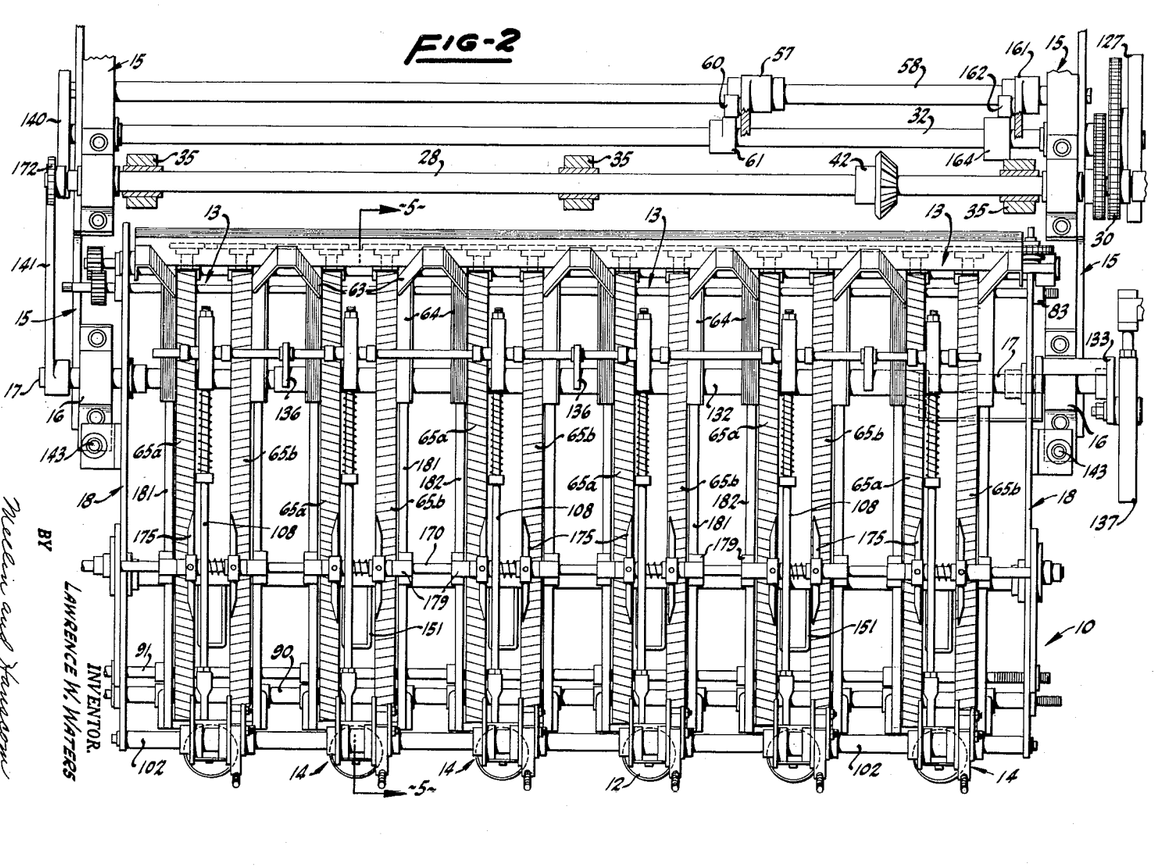
FIG. 2 is a plan view of the device of FIG. 1, taken partly in section, and as seen from the line 2—2 of FIG. 1.

Turning now to the specific details of the invention, the pear orienting machine 10 is illustrated in FIGS. 1 and 2 as being associated with a pear peeling machine 11 (shown in dotted outline) having six pear receiving cups 12 incorporated therein. Accordingly, there are six orienting troughs 13 and pickup heads 14 built into the pear orientor 10.

The pear orientor 10 comprises a stationary frame 15 having journals 16 mounted on either side thereof to support a shaft 17 therebetween. A sub-frame 18 is keyed to shaft 17 for rotative movement therewith relative to stationary frame 14, as will be more fully described hereinafter. Although each frame 15 and 18 is formed from many structural elements, for the purposes of description these frames will be considered as integral structures with these reference numbers being used on the various component elements thereof.

Figure 4:
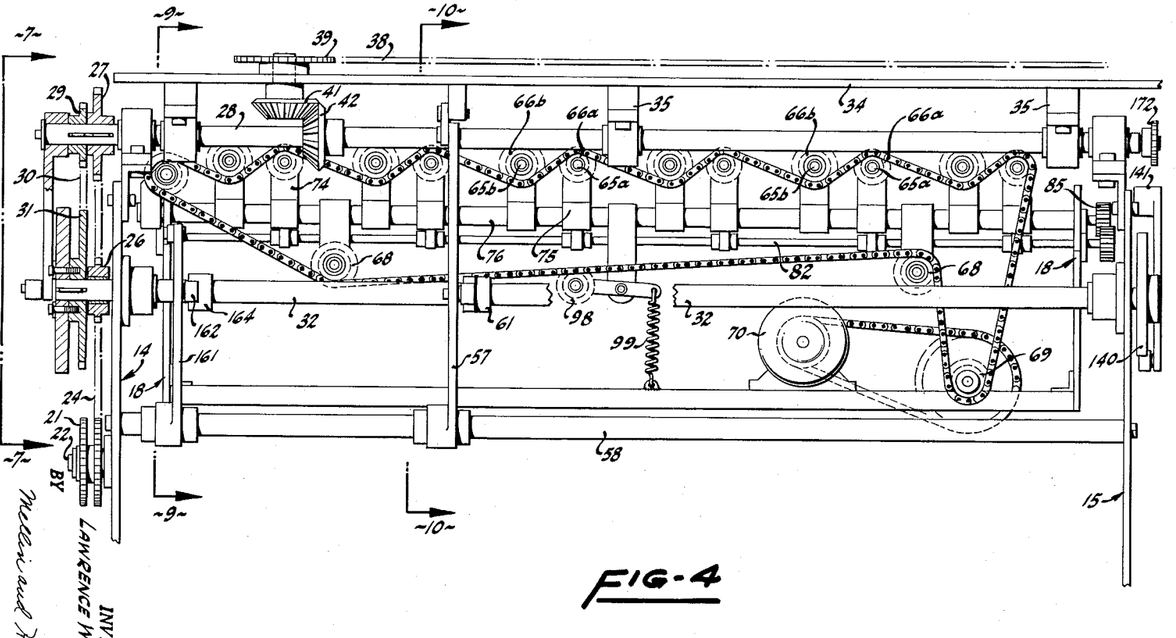
FIG. 4 is a rear elevational view of the invention taken partly in section along the line 4—4 of FIG. 1.
Figure 7:
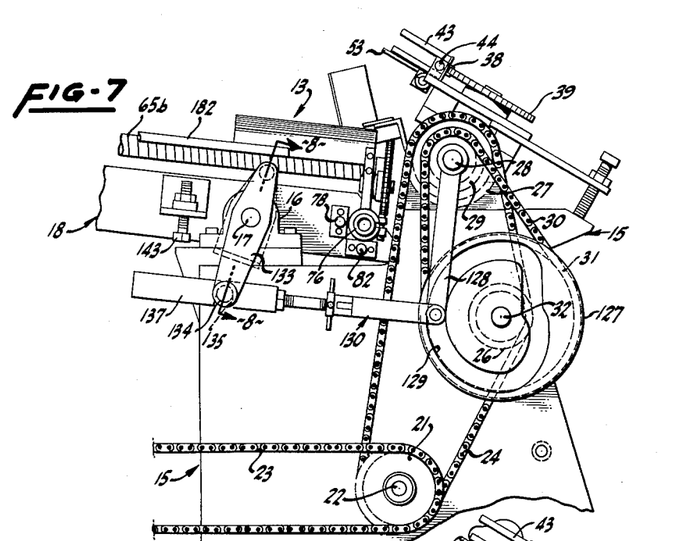
FIG. 7 is a side elevational view of the rear part of the device on the side opposite to the one illustrated in FIG. 1 and as seen from the line 7—7 of FIG. 4.

As best seen in FIGS. 4 and 7, the pear orientor 10 has a twin sprocket 21 mounted on stub shaft 22 and is driven by chain 23 from a suitable power take-off (not shown) on the pear peeling machine 11. Sprocket 21 in turn drives chain 24 which passes around idler sprocket 26, to drive sprocket 27 keyed to the conveyor drive shaft 28. Sprocket 29, also keyed to shaft 28, is connected by chain 30 to sprocket 31 keyed to the main cam shaft 32. Thus, the conveyor drive shaft 28 and cam shaft 32 are both positively driven by, and in synchronism with, the pear peeler 11. Both of these shafts are journaled for rotation in frame 15.

The pear feeding apparatus 33 comprises a base plate 34 mounted by depending journals 35 on conveyor drive shaft 28. Arm 36 (FIG. 7) fixed to base plate 34 carries an adjustment screw 37 engageable with frame 14, so that the tilt of the base plate around shaft 28 may be adjusted as desired.

A conveyor chain 38, trained around sprockets 39 and 40a rotatably mounted at each end of base plate 34, is driven by the meshing engagement of bevel gears 41 and 42, the latter being keyed to conveyor drive shaft 28. Conveyor chain 38 has a plurality of vertically spaced apart pins 43 fixed thereto and straddling rod 44, fixed to the front of the base plate 34.

Sprocket 40a, driven by the conveyor chain 38, is keyed for rotation with sprocket 44b, and drives sprocket 45 by means of chain 46. Sprocket 45 is fixed to shaft 47, as is hopper 48, and thus the hopper 48 is rotated in synchronism with the other elements thus far described.

Hopper 48 is adapted to be filled with pears 20 by any suitable means, automatic or manual, and has a plurality of holes 49 through the bottom thereof. The pears in the hopper will gravitate through these holes but will be stopped by dead plate 50 which underlies most of the bottom of the hopper. As the hopper rotates, each hole 49 will move past the edge 51 of dead plate 50, i.e., to the hole position identified as 49a, allowing the pear therein to drop down onto the guide 52 which is generally coplanar with the dump plate 53 and the base plate 34. The pears are now picked up by the conveyor pins 43 and are moved along the dump plate 53. The conveyor chain 38 and pin 43 move at a linear rate synchronized with the rotation of hopper 48 so that one pear is delivered between each successive pairs of pins 43.

Figure 3:
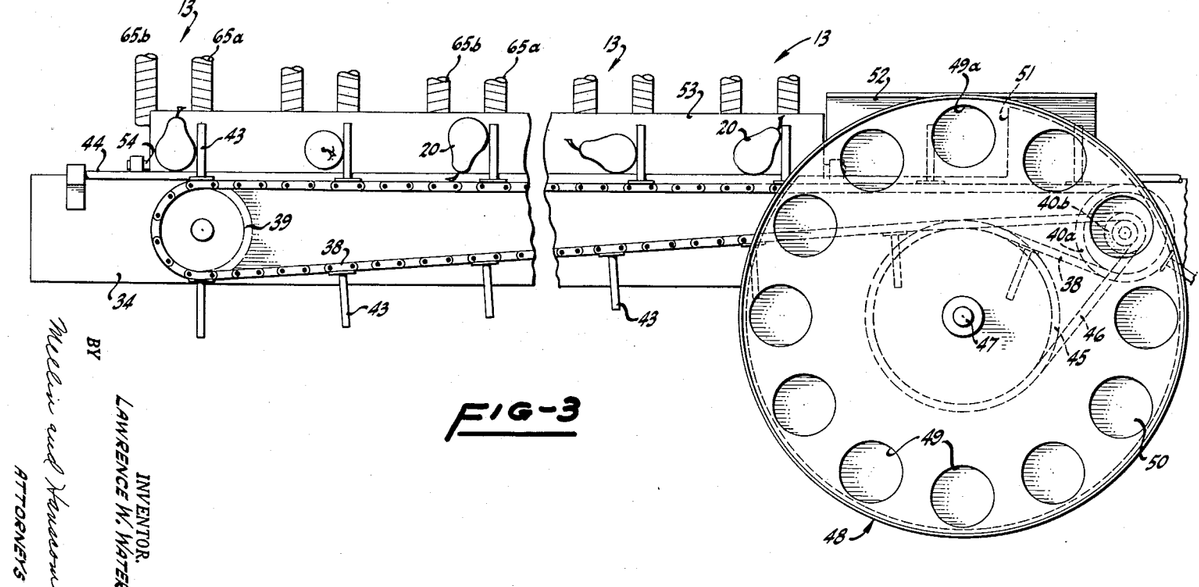
FIG. 3 is a plan view of the apparatus for feeding pears to the orienting screws, as seen from the line 3—3 of FIG. 1.
Figure 10:
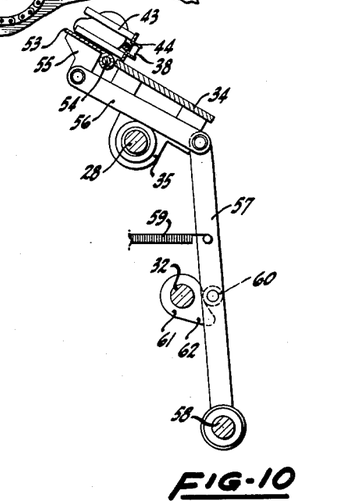
FIG. 10 is a detail view, partially in section, illustrating the cam drive of the pear stop mechanism.

The dump plate 53 is pivoted along its rear edge to rod 54 secured to base plate 34, as best seen in FIGS. 3 and 7. A bracket 55, fixed below dump plate 53 has link 56 pivotally connected thereto, the other end of link 56 being pivotally connected to rocker arm 57 journaled freely for limited rotation on shaft 58 fixed to frame 15. The rocker arm 57 is biased in a counterclockwise direction (FIG. 10) by spring 59 to hold cam follower roller 60 in engagement with cam 61 mounted on the main cam shaft 32. As cam 61 rotates, cam lobe 62 will force the rocker arm 57 in a clockwise direction to tilt the dump plate 53 downwardly so that the pears thereon will be dumped into the orienting troughs 13.

The size of the various sprockets and gears is chosen so that the conveyor chain 38 will move six pears out onto the dump plate 53 each time that the cam shaft 32 completes a full revolution. Thus, each time the conveyor chain moves through six times the distance between successive pairs of pins 43, the dump plate 53 will dump the pears.

As the pears are dumped, they are directed by the inclined guide members 63 into the orienting troughs 13. Vertically extending fins 64 prevent the pears from bouncing out of the troughs after they are dumped thereinto.

Each orienting trough 13 is comprised of two elongated screw members 65a and 65b disposed in generally parallel relationship and spaced laterally apart to support a pear therebetween.

As best seen in FIG. 4, the screw members 65a and 65b have sprockets 66a and 66b, respectively, secured to the rear ends thereof. Chain 67 is trained around these sprockets, idler sprockets 68 and drive sprocket 69. The latter is driven by motor 70 secured to the sub-frame 18. Sprockets 66a have fewer teeth thereon than do sprockets 66b, with the consequence that screw members 65a are rotated more rapidly than are the screw members 65b.

The pitch of screw members 65a and 65b is the same, and consequently the faster rotation of screws 64a will cause unequal rate of thread advance with the result that a pear supported there-between will be concurrently rotated about a vertical axis and moved forwardly toward the front of the machine. Assuming that a pear 20 originally landed in a trough in a position as shown in full line in FIG. 6, the rotation thereof about a vertical axis will move the stem end thereof around and over the gap between the screws. The stem end of the pear will then swing down to the dotted line position so that the longitudinal axis of the pear is vertical after the orientation. The pear will rotate about its longitudinal axis, due to the unequal rate of advance of the screw threads, and will be moved to the front end of the machine.

Normally, the pears are graded to size when delivered to the orienting machine, and thus the pears will all be supported at about the same points thereon by the screw members 65a and 65b so that the desired orientation will occur. If it is desired to operate the machine on a different size grade of pears, the screw members may be adjusted to increase or decrease the spacing there-between.

Figures 5A, 5B, 6:
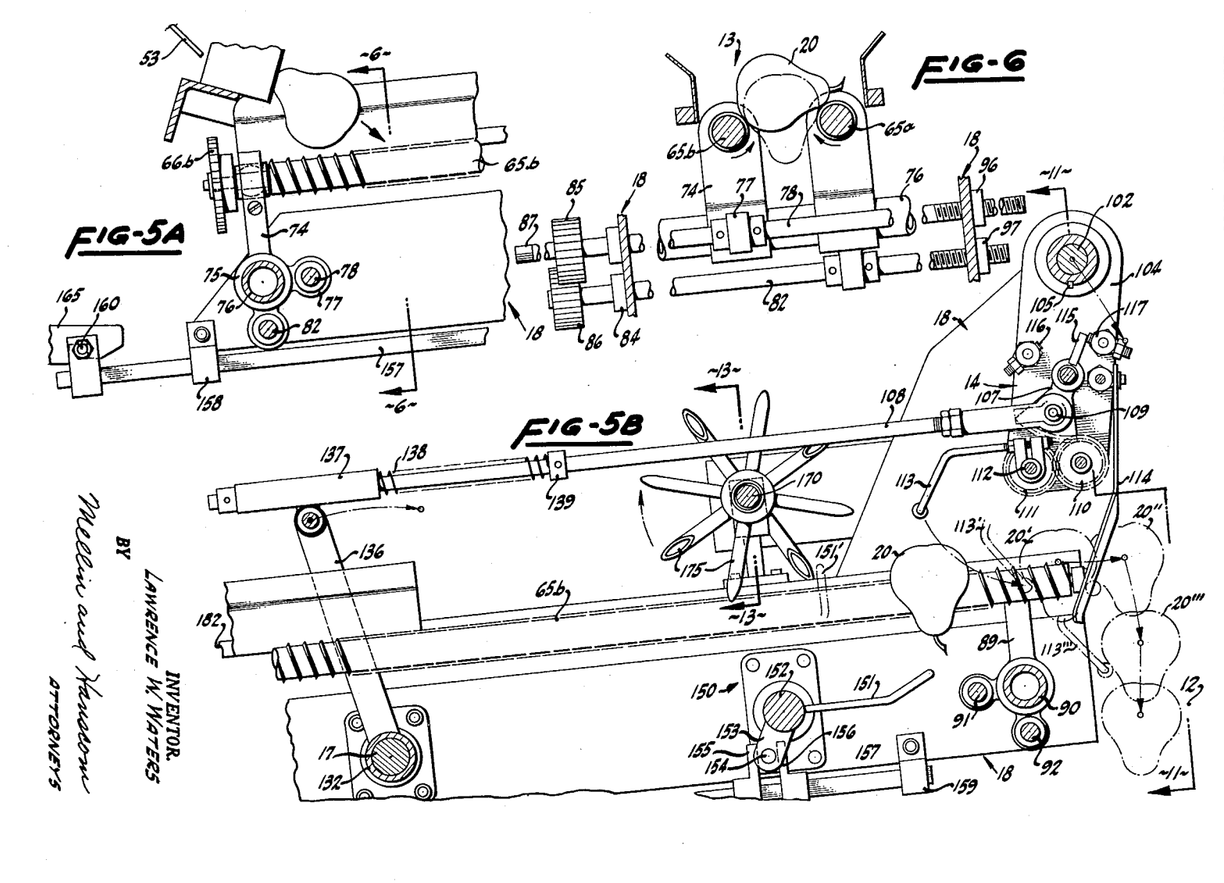
FIGS. 5A and 5B form a continuous vertical sectional view of the pear orienting device as taken on the line 5—5 of FIG. 2.
FIG. 6 is a sectional detail of FIG. 5A, taken on the line 6—6 thereof, illustrating the unoriented and oriented positions of a pear on the orienting screws.
Figure 14:
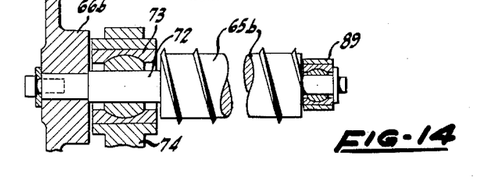
FIG. 14 is a detail view showing the front and rear mountings for the orienting screws.

FIGS. 5A, 6 and 14 illustrate the manner in which the rear end of the screw members are adjustably mounted on the tilting sub-frame 18. The screw member 65b has a reduced diameter neck 72 passing through universal bearing 73 carried by the upper end of support bracket 74. The lower end of bracket 74 forms a collar 75 slidably mounted on support tube 76 which is secured at both ends thereof to frame 18. A second collar 77, formed integrally on bracket 74, fits around adjustment shaft 78. Lock members 79 engage shaft 78 to prevent movement of collar 77 axially of shaft 78.

Screw member 65a is similarly journaled in bracket 81 which has collars mounted on support tube 76 and the second adjustment shaft 82.

Adjustment shafts 78 and 82 are each threaded at one end thereof to engage nuts 83 and 84 fixed to frame 18. The other ends of shafts 78 and 82 have meshed gears 85 and 86 fixed respectively thereto. Shaft 78 has a square end 87 so that the shaft may be turned by a suitable tool. As shaft 78 is rotated it threads itself through nut 83, causing the shaft to move axially and carrying with it all of the brackets 74 and the rear ends of screw members 65b. At the same time, the interengagement of gears 85 and 86 causes adjustment shaft 82 to rotate in an opposite direction, threading itself through nut 84 and moving it axially in a direction opposite to the axial movement of shaft 78. Thus, the orienting screws 65a are all moved concurrently towards or away from the oppositely moving orienting screws 65b. Idler sprocket 98 (FIG. 4) is forced against chain 67 by spring 99 so that the chain remains at a constant tightness as the screws 65a and 65b are adjusted.

The forward ends of screw members 65a and 65b are similarly journaled in brackets 88 and 89 which are mounted on support tube 90 and adjustment shafts 91 and 92. As the square end 93 of shaft 91 is rotated, the meshed gears 94 and 95 cause the shafts to be threaded in opposite directions through nuts 96 and 97, moving the front ends of each set of screw members 65a and 65b in opposite directions. As is thus apparent, the front and rear ends of the screw members can be separately adjusted, desired as.

After the pears 20 are moved to the front of the machine by the orienting screws, they are removed therefrom by the pickup heads 14 for placement into the feed cups 12 of the pear peeling machine 11.

Figure 11:
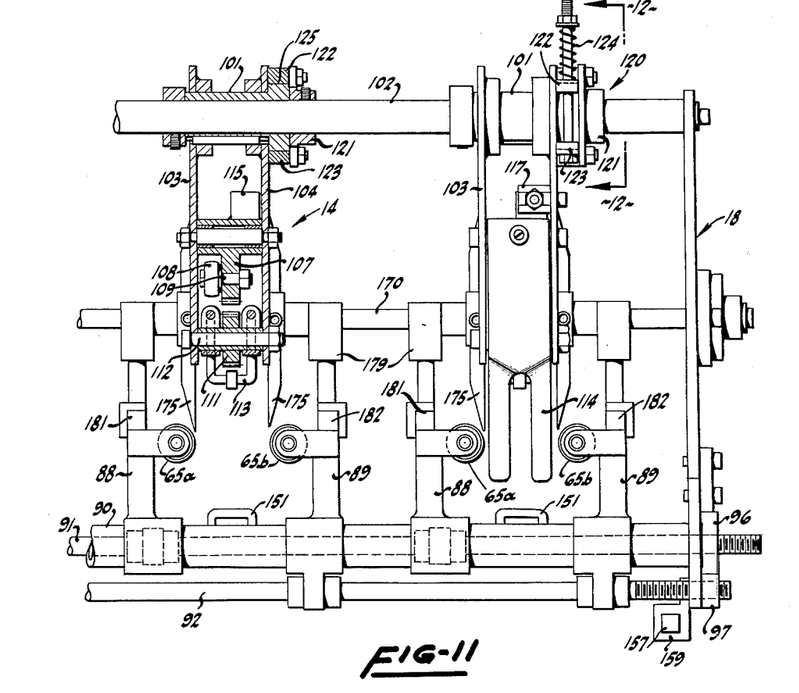
FIG. 11 is a front view of two pear orienting troughs and pickup heads, with one of the pickup heads being shown in section to illustrate the internal construction thereof.

As best seen in FIGS. 5B and 11, each pickup head 14 comprises a collar 101 freely mounted on shaft 102 and side brackets 103 and 104 keyed to collar 101, as by key 105. Shaft 102 is rigidly connected at its ends to frame 18. Rod 106 extends between brackets 103 and 104 and has gear sector 107 loosely mounted for pivotal movement thereon. Connecting rod 108 is loosely secured to gear sector 109. As rod 108 is moved axially to the right (FIG. 5B), it rotates gear sector 107 in a counterclockwise direction around rod 106 and, by means of the meshed gears 110 and 111, rotates shaft 112 in a counterclockwise direction. The generally U-shaped pickup arm 113, bolted to shaft 112, then rotates in a counterclockwise direction to the dotted line position 113', gripping the pear 20 and holding it against the bifurcated resilient leaf spring 114. The spring 114 will deflect slightly as a pear is forced thereagainst so as to accommodate variations in pear size without bruising the fruit.

In the above movement, the stop plate 115 fixed to gear sector 107 comes into engagement with the adjustable stop screw 116, to stop further counterclockwise rotation of the gear sector and pickup arm 113. Continued axial movement of connecting rod 108 to the right rotates the collar 101 about the shaft 102 so that the whole pickup head rotates, carrying the gripped pear to the position illustrated by the dotted line 20''.

By mechanism to be hereinafter described, the entire subframe 18 is tilted about journals 16 to move the pear down to a position illustrated in FIG. 5B by the dotted line 20'''. The connecting rod 108 is then moved axially to the left, causing the pickup arm 113 to rotate in a clockwise direction, freeing the pear to drop the short distance into the cup 12 of the pear peeling machine. Continued rotation of the gear sector 107 brings the stop plate 115 thereon into engagement with the adjustable stop screw 117, and further leftward axial movement of the connecting rod 108 then moves the pickup head 14 back to the original position illustrated in solid lines in FIG. 5B.

Figure 12:
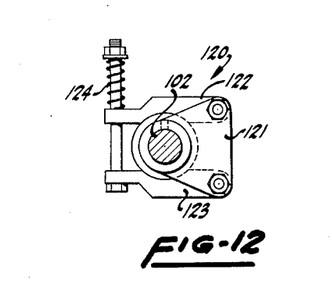
FIG. 12 is a sectional view taken on line 12—12 of FIG. 11, illustrating the details of the brake mechanism for the pickup heads.
Figure 13:
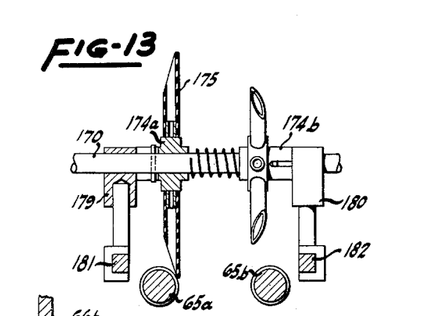
FIG. 13 is a sectional view, taken on line 13—13 of FIG. 5B, illustrating the constructional details of the resilient auxiliary orienting fingers.

In the above described operation, axial movement of the connecting rod 108 first produces rotation of the pickup arm 113 and then produces rotation of the entire pickup head about shaft 102. The delay in rotation of the pickup head is insured by friction brake 120 mounted on shaft 102. This brake comprises a bracket 121 (FIG. 12), keyed to shaft 102, having brake arms 122 and 123 mounted for pivotal movement thereon and biased towards each other by spring 124. The brake arms 122 and 123 embrace hub 125 of collar 101 therebetween and resist rotation thereof until the gear sector stop plate 115 engages a stop screw 116 or 117, and the drive of connecting arm 108 is directly transmitted to the pickup head for rotation thereof. As may be seen by the drawings, brake 120 resists both directions of rotation of collar 101.

Figure 8:
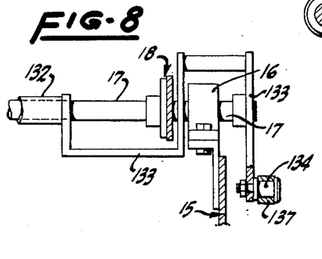
FIG. 8 is a sectional detail, taken on line 8—8 of FIG. 7, illustrating the construction of the pear pickup drive shaft.

The connecting rod 108 is operated in timed synchronism with the pear peeling machine 11 and is driven by a face cam 127 fixed to the main cam shaft 32 (FIG. 7). Link 128, loosely journaled at its upper end on the conveyor drive shaft 28, has a cam follower roller thereon riding in the cam track 129 of face cam 127. As link 128 oscillates back and forth for each revolution of face cam 127 it reciprocates the adjustable drive bar 130 and notched weight bar 131. As seen in FIG. 8, sleeve 132 surrounds shaft 17 and has a rigid arm 133 connected thereto which has a roller 134 secured thereto and disposed in the notch 135 of the weight bar 131. As is apparent, each rotation of the main cam shaft 32 will rotate the sleeve 132 back and forth through a limited arc.

Returning to FIG. 5B, sleeve 132 has crank 136 welded thereto. The connecting rod 108 extends through a sleeve 137 secured to the upper end of crank 136. Spring 138, surrounding connecting rod 108 and confined between sleeve 137 and connecting rod collar 139, transmits the drive from crank 136 to connecting rod 108. The spring 138 is sufficiently strong so that the crank 136 will drive the pickup head 14 through its cycle of operation, while yet allowing a safety factor in case there is a jam and the pickup head cannot rotate.

An additional safety feature is incorporated in the pickup head drive described above. If for any reason sleeve 132 is jammed so that it cannot rotate on shaft 17, the drive between weight bar 131 and arm 133 will be disconnected since the inclined surface of notch 135 will ride up on roller 134, allowing the weight bar to continue its reciprocation without driving arm 133 or sleeve 132.

As has been mentioned above, after the pear 20 has been picked up by the pickup head 14 and moved to the dotted line position 20'' (FIG. 5B) the entire sub-frame 18 is pivoted. As will be noted on FIG. 1, the main cam shaft 32 has a cam 140 secured thereto for rotation therewith. Crank 141, keyed to shaft 17, has a cam follower roller 142 thereon in engagement with cam 140. As cam 140 rotates in a clockwise direction from the position shown in FIG. 1, crank 141 will be allowed to rotate in a clockwise direction, allowing shaft 17 and the entire sub-frame 18 to pivot in journals 16 in a clockwise direction so that the pears gripped by the pickup heads 14 are lowered towards the cups 12. Adjustment screws 143, mounted on sub-frame 18, engage frame 15 to limit the clockwise movement of the sub-frame 18.

Figure 9:
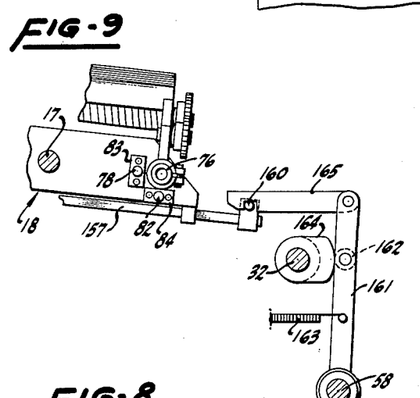
FIG. 9 is a sectional detail with parts shown in elevation, as seen from line 9—9 of FIG. 4, illustrating the cam operation of the pear feeding mechanism.

During the portion of the cycle wherein the pear pickup arm 113 is in operation, it is desirable that the pears being moved forwardly on the orienting screws be prevented from reaching the end of the screws. To accomplish this a pear stopping mechanism 150 is employed, this mechanism being best illustrated in FIGS. 5A, 5B and 9. A generally U-shaped stop member 151 is provided for each orienting trough, these members being secured to shaft 152 extending transversely of the machine. A crank arm 153, fixed to shaft 152, has a pin 154 thereon engaged between fingers 155 and 156 secured to rod 157. Rod 157 is reciprocally mounted in supports 158 and 159 secured to frame 18, and has a drive pin 160 secured to one end thereof. In FIG. 9, crank 161, journaled on shaft 58, has a cam follower roller 162 biased by spring 163 into engagement with cam 164 mounted on the main cam shaft 32. Notched link 165 connects crank 161 to drive pin 160.

As is apparent, a full revolution of cam shaft 32 will produce a forward and backward movement of rod 157, moving the pear stop members 151 alternately between the full and dotted line positions 151 and 151' shown in FIG. 5B. Since these members are directly driven from cam shaft 32 as are the pear pickup heads 14, there is no problem in maintaining the desired synchronization of operation therebetween.

Occasionally, a pear may fail to become oriented as it is moved towards the front of the machine by the orienting screws. For example, if the pear has gotten into a position such that its stem end lies between adjacent threads of one of the orienting screws, then the differential movement of the screws may not be sufficient to dislodge the pear so that it will orient properly. To overcome this occasional problem, each set of screw members has auxiliary orienting devices associated therewith to dislodge any such unoriented pears. These auxiliary devices are best illustrated in FIGS. 1, 2, 5B and 13.

Shaft 170 extends transversely of the machine, being journaled at each end thereof for rotation in sub-frame 18. Drive chain 171 is trained between and around sprockets 172 and 173 fixed to cam shaft 32 and shaft 170, respectively, to provide a power drive for shaft 170. Hubs 174a and 174b are disposed on shaft 170 in association with the orienting screws 65a and 65b, and each hub has four tubular resilient fingers 175 extending radially therefrom. Each hub has a slot 176 therethrough through which pins 177 extend, so as to allow movement of the hubs axially of shaft 170 while coupling the hubs to the shaft for rotation therewith. The hubs are disposed on the shaft so that the fingers 175 on one hub are 45° out of phase with the fingers on the hub associated therewith.

Springs 178, disposed around shaft 170 and confined between each pair of hubs 174a and 174b, bias the hubs in opposite directions, forcing them against the stop members 179 and 180. These stop members are clamped to rods 181 and 182, respectively, which in turn are secured to the screw supporting brackets 88 and 89. Thus, as the orienting screws 65a and 65b are moved towards or away from each other, the stop members 179 and 180 will be moved therewith, so that the rubber fingers 175 will remain in the same positional relation to the orienting screw members.

The rubber fingers 175 on hubs 174a and 174b are out of phase with one another so that an unoriented pear will be acted upon by only one finger at a time. If both sets of fingers engaged a pear simultaneously, they would merely tend to roll the pear along the orienting screws while maintaining the pear in its unoriented position. However, with only one set of fingers acting upon one side of the pears, the unbalanced force thereon will dislodge it so that the stem end will swing down between the orienting screws, into oriented position.

Turning now to the operation of the orienting machine, it has been described that the machine is power-driven by chain 23 from a suitable power take-off (not illustrated) of the pear peeling machine 11. The drive connections between the pear peeling machine 11 and the main cam shaft 32 of the orienting machine is designed so that the cam shaft 32 will rotate in synchronism with the operation of the pear receiving cups 12 so that the cups 12 and cam shaft 32 will operate through a complete cycle or revolution in the same length of time. Since the cam shaft 32 is driven in a positive manner by chains and sprockets, the pear orienting machine cannot get out of synchronism with the pear peeling machine.

The drive connections are also designed so that the pear conveyor chain 38 will travel a distance equal to the width of all the orienting troughs 13 in the time that the main cam shaft 32 takes to complete a full revolution. Thus, each time that the dump plate 53 is operated by cam 61 on the main cam shaft, a pear will be dumped ino each of the six orienting troughs 13. The cam 61 is adjusted on cam shaft 32 so that dumping will occur only when the pears are directly over the orienting troughs into which they are to be dumped.

The orienting screws 65a and 65b of each trough then rotate the pears 20 supported thereon, by the different rate of advance of the screw threads so that the stem end of the pear is free to swing downwardly between the screws. At the same time, the screws advance the pears forwardly of the machine towards the pear pickup heads 14. There is no positive gripping of the pears by the screws and thus the pears cannot be handled in synchronism with the operation of the pear peeling machine 11. For this reason, there is no necessity that the orienting screws be driven in synchronism with the pear peeling machine, and they are instead driven by the motor 70. This speed of the motor can then be adjusted to give optimum results without disturbing the synchronized action of the other operating parts of the machine.

There will generally be several pears in each orienting trough as the machine operates, with each pear being concurrently rotated and advanced towards the pickup head associated therewith.

All six of the pickup heads 14 operate concurrently, and since they are driven from the main cam shaft 32, they too operate in synchronism with the pear peeling machine. The face cam 127 is adjusted on cam shaft 32 so that the pears will be gripped and swung out over the cups 12 when the cups are in their inactive loading position illustrated in dotted lines in FIGS. 1 and 5B.

While the gripped pears have been moved from the end of the orienting screws, the screws continue to rotate and continue to advance pears thereon. Since the pickup arm 113 must swing back to the full line position shown in FIG. 5B after releasing the pear held thereby, it is necessary to keep pears from advancing to the end of the screws where they would interfere with the return motion of the pickup arm. It is for this reason that the pear stop 150 is provided. As seen in FIG. 9, the operating cam 164 will allow the stop member 151 to be in the dotted line position of FIG. 5B for most of a cycle of the machine, and will swing the stop member down briefly to the full line position to allow a pear to pass to the pickup head. Thus, for each cycle of the machine, the pear stop will allow a single pear to pass thereby. Cam 164 is adjusted on cam shaft 32 so that the pear is released for forward movement at a time during the cycle of operation of the pickup head so that the pear will be in a position to be picked up on the next cycle of the pickup head.

As the pickup heads move the pears out from the orienting screws, the entire sub-frame 18 pivots relative to frame 15 under the influence of cam 140 mounted on cam shaft 32, to lower the pears towards the cups 12. Thus, when the pears are released by the pickup heads 14, they have only a very short distance to fall into the cups, and will not become disoriented.

After release of the pears, frame 18 is pivoted back to its original position so as to be out of the path of movement of the cups 12, allowing the pear peeling machine 11 to operate without interference.

As may be seen from the above description, the dump plate 53, the pickup heads 14, the pear stops 150 and the tilting of the sub-frame 18 all obtain their drive from cams mounted on the single cam shaft, which shaft is positively driven in synchronization with the pear peeling machine 11. Since each cam is separately adjustable on the shaft, exact synchronism between the orienting machine and the pear peeler can be obtained easily and quickly, which allows the orienting machine to be used with different peeling machines, each of which may have slightly different operating cycles of the pear receiving cups 12.

In the particular form of the invention illustrated herein, orientation of the pears has been achieved by rotating the orienting screws at different speeds so that the pears will be urged forwardly at different rates by each screw, causing the pear to rotate. The same motion of the pears could be generated by rotating the two screws at the same rate, if the threads are of different pitch. Thus, the rate of thread advance would be different for the two screws and would produce the same rotation and advance of the pears supported thereon.

The orienting screws 65a and 65b of each pair thereof rotate in opposite directions as shown in FIG. 4 and in such directions as to tend to eject a pear upwardly therefrom. This counter rotation serves two purposes. First, the pears will be carried loosely on the screws which allows the stem end thereof to swing freely downwardly to oriented position. Secondly, the counter-rotation will prevent rolling of the pears in a plane perpendicular to the screws, which might occur if the screws were rotated in the same direction.

It is to be realized that the form of the invention herein shown and described is to be taken as a preferred embodiment of the same and that various changes may be made in the shape, size and arrangement of parts without departing from the spirit of the invention or the scope of the attached claims.

Having thus described my invention, what I claim and desire to secure by Letters Patent is:

1. A pear orienting and feeding machine for use with a pear peeling apparatus having a loading cup oscillating through an arcuate path between loading and impaling positions, said orienting and feeding machine comprising: a frame, an orienting trough mounted on said frame with the foreward end of said trough being adapted to be adjacent to and above the loading position of said cup, said orienting trough comprising a pair of elongated generally horizontal and generally parallel screw members spaced apart to support a pear therebetween, means for rotating said screw members in opposite directions with the thread advance thereof being directed towards the forward end of said trough and with the rate of thread advance being unequal, pickup means operatively associated with the forward end of said trough for operation through a cycle wherein a pear on the forward ends of said screw members is gripped and moved to a position over the loading position of said cup and there released, and means for operating said pickup means through its cycle in synchronism with the oscillation of said cup and wherein said pear is released when said cup is at its loading position.

2. In a pear orienting and feeding machine as set forth in claim 1 wherein said pickup means comprises a pickup head mounted above said screw member for oscillation about an axis transverse thereto, brake means for restricting free oscillation of said pick-up head, a resilient leaf spring depending from said head to between said screw members, a pickup arm mounted for free oscillation about an axis above and transverse to said screw members, and wherein said means for operating said pickup means through its cycle includes means for oscillating said pickup arm towards and away from said leaf spring to grip and release a pear therebetween.

3. A pear orienting and feeding machine as set forth in claim 1 and further including a stop member disposed between said orienting screw members adjacent the forward ends thereof in a first position to engage and stop the forward movement of a pear supported on and advanced towards the forward end of said screw members, said stop member being mounted for movement away from between said screw members to a second position out of engagement with a pear supported by said screw members, and means for moving said stop member from its first to its second position and back to its first position each time said pickup means is operated through a cycle of operation to allow a single pear on said screw members to be advanced past said stop member to a position on said screw members where it will be gripped by said pickup means.

4. A pear orienting and feeding machine as set forth in claim 1 and further including an auxiliary orienting device associated with said orienting trough, said auxiliary device comprising means disposed above each of the screw members to engage and dislodge the stem end of a pear hung up between the threads of one of said screw members, so that the stem end of said pear will be free to swing down between said screw members.

5. A pear orienting and feeding machine as set forth in claim 1 and further including an auxiliary orienting device operatively associated with said orienting trough, said auxiliary orienting device comprising a hub mounted above each of the two screw members, means for rotating said hubs about an axis generally transverse to said trough, a plurality of fingers extending from each of said hubs to engage the stem end of a pear hung up between the threads of one of said screw members and dislodge the stem end of the pear therefrom.

6. A pear orienting and feeding machine as set forth in claim 1 and further including a dump plate disposed over the end of said orienting trough opposite to the forward end thereof, means to position a randomly oriented pear on said dump plate over said orienting trough, said dump plate being pivotally mounted to dump the pear thereon into said trough, and means to operate said dump plate once in each cycle of operation of said pickup means.

7. A pear orienting and feeding machine comprising a frame, a cam shaft rotatably journaled in said frame, an orienting trough mounted on said frame, said orienting trough comprising a pair of elongated generally horizontal and generally parallel screw members spaced apart to support a pear therebetween, means for rotating said screw members in opposite directions with the thread advance thereof being directed towards the forward ends of said troughs and with the rate of thread advance being unequal, pickup means operatively associated with the forward end of said trough for operation through a cycle wherein a pear on the forward ends of said screw members is gripped and moved away from said screw members and there released, means for operating said pickup means through its cycle, means pivotally mounting said pickup means on said frame for vertical oscillatory movement of said pickup means, and means for periodically moving said pickup means through its vertical oscillatory cycle and wherein said pickup means will be oscillated to its lowest positions when a pear gripped by said pickup means has been moved the furthest away from said screw members.

8. In a pear orienting and feeding machine as set forth in claim 7 wherein said pickup means comprises a pickup head mounted above said screw member for oscillation about an axis transverse thereto, brake means for restricting free oscillation of said pickup head, a resilient leaf spring depending from said head to between said screw members, a pickup arm mounted for free oscillation about an axis above and transverse to said screw members, and wherein said means for operating said pickup means through its cycle includes means for oscillating said pickup arm towards and away from said leaf spring to grip and release a pear therebetween.

9. A pear orienting and feeding machine as set forth in claim 7 and further including a stop member disposed between said orienting screw members adjacent the forward ends thereof in a first position to engage and stop the forward movement of a pear supported on and advanced towards the forward end of said screw members, said stop member being mounted for movement away from between said screw members to a second position out of engagement with a pear supported by said screw members, and means including a cam mounted on said cam shaft for moving said stop members from its first to its second position and back to its first position each time said pickup means is operated through a cycle of operation to allow a single pear on said screw members to be advanced past said stop member to a position on said screw members where it will be gripped by said pickup means.

10. A pear orienting and feeding machine as set forth in claim 7 and further including an auxiliary orienting device associated with said orienting trough, said auxiliary device comprising means disposed above each of the screw members to engage and dislodge the stem end of a pear hung up between the threads of one of said screw members, so that the stem end of said pear will be free to swing down between said screw members.

11. A pear orienting and feeding machine as set forth in claim 7 and further including an auxiliary orienting device operatively associated with said orienting trough, said auxiliary orienting device comprising a hub mounted above each of the two screw members, means for rotating said hubs about an axis generally transverse to said trough, and a plurality of fingers extending from each of said hubs to engage the stem end of a pear hung up between the threads of one of said screw members and dislodge the stem end of the pear therefrom.

12. A pear orienting and feeding machine for use with a pear peeling apparatus having a loading cup oscillating through an arcuate path between loading and impaling positions, said orienting and feeding machine comprising: a frame, a cam shaft rotatably journaled in said frame, means to rotate said cam shaft in synchronism with the oscillation of said cup, an orienting trough mounted on said frame with the forward end of said trough being adapted to be adjacent to and above the loading position of said cup, said orienting trough comprising a pair of elongated generally horizontal and generally parallel screw members spaced apart to support a pear therebetween, means for rotating the screw members in opposite directions with the thread advance thereof being directed towards the forward end of said trough and with the rate of thread advance being unequal, pickup means operatively associated with the forward end of said trough for operation through a cycle wherein a pair on the forward ends of said screw members is gripped and moved to a position over the loading position of said cup and there released, means including a cam on said cam shaft for operating said pickup means through its cycles in synchronism with the oscillation of said cup and wherein said pear is released when said cup is at its loading position, means pivotally mounting said pickup means on said frame for oscillatory movement of said pickup means down to and up from the loading position of said cup, and means including a cam on said cam shaft for periodically oscillating said pickup means in synchronism with the oscillation of said cup and wherein said pickup means is oscillated to its lowest position when said cup is in its loading position.

13. A pear orienting and feeding machine for use with a pear peeling apparatus having a plurality of loading cups oscillating through an arcuate path between loading and impaling positions, said orienting and feeding machine comprising: a frame, a cam shaft rotatably journaled in said frame, means to rotate said cam shaft in synchronism with the oscillation of said cups, a plurality of orienting troughs mounted on said frame, there being one trough for each of said cups with the forward ends of said troughs being adapted to be adjacent to and above the loading positions of said cups, each of said orienting troughs comprising a pair of elongated generally horizontal and generally parallel screw members spaced apart to support a pear therebetween, means for rotating the screw members of each pair in opposite directions with the thread advance thereof being directed towards the forward ends of said troughs and with the rate of thread advance being unequal, pickup means operatively associated with the forward end of each trough for operation through a cycle wherein a pear on the forward ends of said screw members is gripped and moved forwardly to a position over the loading position of the cup also associated with said trough and there released, and means including a cam on said cam shaft for operating said pickup means through its cycles in synchronism with the oscillation of said cups and wherein said pears are released when said cups are at their loading positions.

14. A pear orienting and feeding machine for use with a pear peeling apparatus having a plurality of loading cups oscillating through an arcuate path between loading and impaling positions, said orienting and feeding machine comprising: a frame, a cam shaft rotatably journaled in said frame, means to rotate said cam shaft in synchronism with the oscillation of said cups, a plurality of orienting troughs mounted on said frame, there being one trough for each of said cups with the forward ends of said troughs being adapted to be adjacent to and above the loading positions of said cups, each of said orienting troughs comprising a pair of elongated generally horizontal and generally parallel screw members spaced apart to support a pear therebetween, means for rotating the screw members of each pair in opposite directions with the thread advance thereof being directed towards the forward ends of said troughs and with the rate of thread advance being unequal, pickup means operatively associated with the forward end of each trough for operation through a cycle wherein a pear on the forward ends of said screw members is gripped and moved to a position over the loading position of the cup associated with said trough and there released, means including a cam on said cam shaft for operating said pickup means through its cycles in synchronism with the oscillation of said cups and wherein said pears are released when said cups are at their loading positions, means pivotally mounting said pickup means on said frame for oscillatory movement of said pickup means down to and up from the loading positions of said cups, and means including a cam on said cam shaft for periodically oscillating said pickup means in synchronism with the oscillation of said cups and wherein said pickup means will be oscillated to its lowest position when said cups are in their loading positions.

15. In a pear orienting and feeding machine as set forth in claim 14 wherein said pickup means comprises a pickup head mounted above said screw member for oscillation about an axis transverse thereto, brake means for restricting free oscillation of said pickup head, a resilient leaf spring depending from said head to between said screw members, a pickup arm mounted for free oscillation about an axis above and transverse to said screw members, and wherein said means for operating said pickup means through its cycle includes means for oscillating said pickup arm towards and away from said leaf spring to grip and release a pear therebetween.

16. A pear orienting and feeding machine as set forth in claim 14 and further including a pear stop device operatively associated with each of said orienting troughs, each said pear stop device comprising a stop member disposed between said orienting screw members adjacent the forward ends thereof in a first position to engage and stop the forward movement of a pear supported on and advanced towards the forward end of said screw members, said stop member being mounted for movement away from between said screw members to a second position out of stopping engagement with a pear supported by said screw members, and means including a cam mounted on said cam shaft for moving said stop member from its first to its second position and back to its first position each time said pickup means is operated through a cycle of operation to allow a single pear on said screw members to be advanced past said stop member to a position on said screw members where it will be gripped by said pickup means.

17. A pear orienting and feeding machine as set forth in claim 14 and further including an auxiliary orienting device associated with each of said orienting troughs, said auxiliary device comprising means disposed above each of the screw members to engage and dislodge the stem end of a pear hung up between the threads of one of said screw members, so that the stem end of said pear will be free to swing down between said screw members.

18. A pear orienting and feeding machine as set forth in claim 14 and further including an auxiliary orienting device operatively associated with each orienting trough, said auxiliary orienting device comprising a hub mounted above each of the two screw members, means for rotating said hubs about an axis generally transverse to said trough, and a plurality of fingers extending from each of said hubs to engage the stem end of a pear hung up between the threads of one of said screw members and dislodge the stem end of the pear therefrom.

19. A pear orienting and feeding machine as set forth in claim 14 and further including a dump plate disposed over the ends of said orienting troughs opposite to the forward ends thereof, means to position a randomly oriented pear over each orienting trough on said dump plate, said dump plate being pivotally mounted to dump the pears thereon into said troughs, and means including a cam on said cam shaft to operate said dump plate once in each cycle of operation of said pickup means.

20. A pear orienting and feeding machine for use with a pear peeling apparatus having a loading cup movable from a loading position to an impaling position, said orienting and feeding machine comprising: a frame, an orienting trough mounted on said frame with the forward end of said trough being adapted to be adjacent to and above the loading position of said cup, said orienting trough comprising a pair of elongated generally horizontal and generally parallel screw members spaced apart to support a pear therebetween, means for rotating said screw members in opposite directions with the thread advance thereof being directed towards the forward end of said trough and with the rate of thread advance being unequal, transfer means operatively associated with the forward end of said trough for gripping a pear as said pear rides on the forward ends of said screw members and for moving said gripped pear to a position over the loading position of said cup and for there releasing said pear.

References Cited in the file of this patent

UNITED STATES PATENTS

| | | |
|---|---|---|
| 586,866 | Potter | July 20, 1897 |
| 2,596,798 | Thompson | May 13, 1952 |